Dec. 22, 1964    M. W. LOVELAND    3,162,293
DEVICE FOR ORIENTING PEARS
Filed Feb. 27, 1963    4 Sheets-Sheet 1

INVENTOR.
MALCOLM W. LOVELAND
BY Eckhoff and Slick
ATTORNEYS

Dec. 22, 1964  M. W. LOVELAND  3,162,293
DEVICE FOR ORIENTING PEARS
Filed Feb. 27, 1963  4 Sheets-Sheet 3

INVENTOR.
MALCOLM W. LOVELAND
BY Eckhoff and Slick
ATTORNEYS

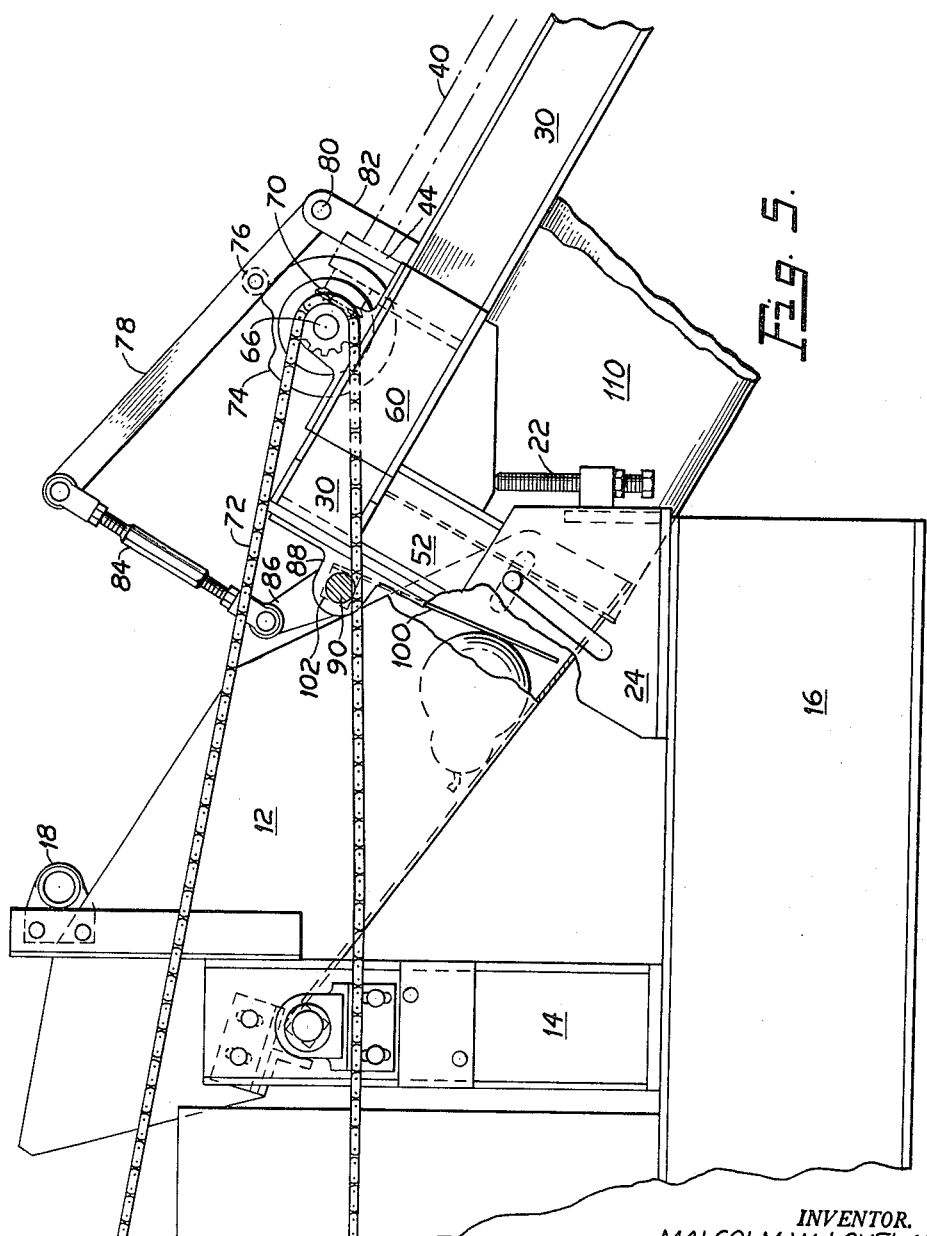

3,162,293
DEVICE FOR ORIENTING PEARS
Malcolm W. Loveland, Orinda, Calif., assignor to Atlas Pacific Engineering Company, a corporation of California
Filed Feb. 27, 1963, Ser. No. 261,464
4 Claims. (Cl. 198—33)

This is a continuation-in-part of application Serial No. 81,024, filed January 6, 1961.

This invention relates in general to a machine for orienting fruit such as pears and more particularly to a machine capable of orienting and feeding objects, such as a pear, having a relatively bulbous end and a smaller more cylindrical stem end.

Pear processing machines are well-known in which pears are placed by hand into a feed cup and thereafter the cup is moved to impale the pear on a spindle. While on the spindle, the pear is peeled and a core cut in the pear to remove the seed cell. Because hand feeding is relatively slow and laborious, the operation can only be carried on at a relatively reduced rate and at considerable expense.

Generally, this invention comprises an orienting device into which a pear can be fed in any position and from which it emerges in a predetermined position of alignment with respect to its major axis. If a pear is caused to slide down an inclined elongated U-shaped chute provided by a flexible sheet, the pear can be turned readily into a position in which the stem-end leads the pear down the chute. Because the chute is made of a flexible material, it instantly accommodates itself to the size of the fruit, turning the fruit so that the chute side walls engage the maximum dimension of the fruit at its butt end. The fruit is thus turned into a position in which the stem-end is leading.

To facilitate passage of the fruit through the chute it is desirable to move the inclined chute relatively rapidly back and forth along its longitudinal axis so that relative movement is imparted to the fruit traversing the chute. This movement also ensures that any fruit in the chute having its stem-end trailing is quickly turned to the desired position. Means are provided for constricting the side walls of the chute momentarily, preferably at a point slightly below the mid-point of the butt of the fruit. This momentary constriction serves not only to time the delivery of the fruit from the chute to the transfer cup but slows the progress of the pears to prevent excessive tumbling or rolling of substantially spherical fruit. It also causes fruit with an unusually long stem-end to rotate immediately into the desired position upon contact. This constricting of the side walls of the chute is an important element of the present invention for without it some 10% of the fruit will fail of orientation, the fruit tumbling freely through the chute and emerging erratically with the stem-end trailing rather than leading. Since the processing machines are designed and built to operate with fruit fed in only one position, any fruit fed to the processing machine with its stem-end pointing in the wrong directon will be wasted in the processing machine.

The material of which the chute is fabricated is relatively important in that it should be such that a suitable coefficient of friction exists between it and the article fed. A cloth-like texture gives good results. The chute should should have sufficient rigidity so that the shaker action is effective in moving the fruit down the chute. If the chute is too flexible it will cling to the fruit while the side walls will flex and absorb the shaker action. I have used various materials to provide the chute such as a silicone coated glass, vinyl coated glass cloth and a light-weight canvas with neoprene or a vinyl resin.

The chute can be provided of a single sheet of material or of several sheets arranged in an interlocking relationship with an upper sheet fitting in the next lower sheet. A chute provided of a single sheet can orient about fifteen pears a minute since a certain minimum length of chute is required to accomplish orientation and since but one pear can be present in the chute at a time.

When a relatively large pear is immediately followed or immediately preceded by a relatively small pear, the small pear may pass entirely through without being oriented, due to the fact that the flexible, laterally expansible chute is forced to a width suitable for the larger pear while the smaller pear essentially fails to contact the side walls of the chute and hence fails to be overturned if it enters the chute with its butt end leading. By making the chute of several short lengths in a telescoping relationship, each pear is acted upon by the section on which it is supported. This enables pears of different sizes to be oriented independently and simultaneously for a large pear for example will not affect orientation of a small pear as in a single sheet chute. Thus, when a chute made up of several sections is employed it is not necessary to grade the fruit as to size as with a single section chute. Also, since two or more pears can be undergoing orientation at the same time in a multiple section chute, the capacity of the chute is increased correspondingly. Another advantage in the use of the several section chute is that the small step down going from one chute to the next helps to start a longer neck pear, passing through bulb end first, to start to turn over as though the chute were made steeper in slope momentarily. There is a limit to the chute slope where the fruit tends to tumble through or just slide through. This is a function of coefficient of friction and position of the center of gravity of the pear.

If the pears are graded so that they are about the same size, one can use a single sheet chute, providing several sets of cooperating fingers or gates along the length of the chute.

In a preferred embodiment of this invention, the single elongated chute of a relatively flexible material is replaced with a plurality of interlocking chutes, each of a relatively short length. Cooperating pairs of fingers or gates adjacent the ends of the interlocking chutes assure that no more than single pear enters a given segment of the device at any one time. This is important since the maximum width of the chute of flexible material must be no greater than the maximum width of the fruit therein if proper friction between the surface of the fruit and the chute interior is to be maintained and proper orientation assured.

That is, irrespective of the chute length or number of segments employed, proper operation is dependent upon the fact that the opposed side walls fall into substantially parallel planes spaced apart a distance when measured normal to the walls, which is substantially less than the maximum diameter of the butt end of a pear. And when the chute is inclined to the vertical and a pear placed at the upper end thereof, the side walls engage the pear at its butt end and restrain it somewhat so that passage of the pear down the chute is impeded and an overturning moment imparted. The pears emerging from the bottom of the chute are thus all oriented with their stem ends leading the butt ends.

In general the broad object of the present invention is to provide an improved fruit orienting device, particularly one adapted for orienting pears at high speed.

A further object of the present invention is to provide a novel and an improved pear orienting and feeding apparatus.

It is a further object of this invention to provide a system which is of relatively short length but which is capable of orienting a plurality of pears of different sizes simultaneously.

Still another object of this invention is to provide a system which is capable of orienting both a relatively large diametered and a relatively small diametered pear, though the two may pass through the orienting device in very close proximity to one another.

Yet another object of this invention is to provide a device for orienting pears which assures that the fruit being oriented is fed in a proper timed sequence to such receptacles as are utilized to convey the fruit to a subsequent station.

In the drawings:

FIGURE 5 is an enlarged fragmentary view of the gate mechanism used to supply fruit at the proper pace to the orientor.

Figure 1:
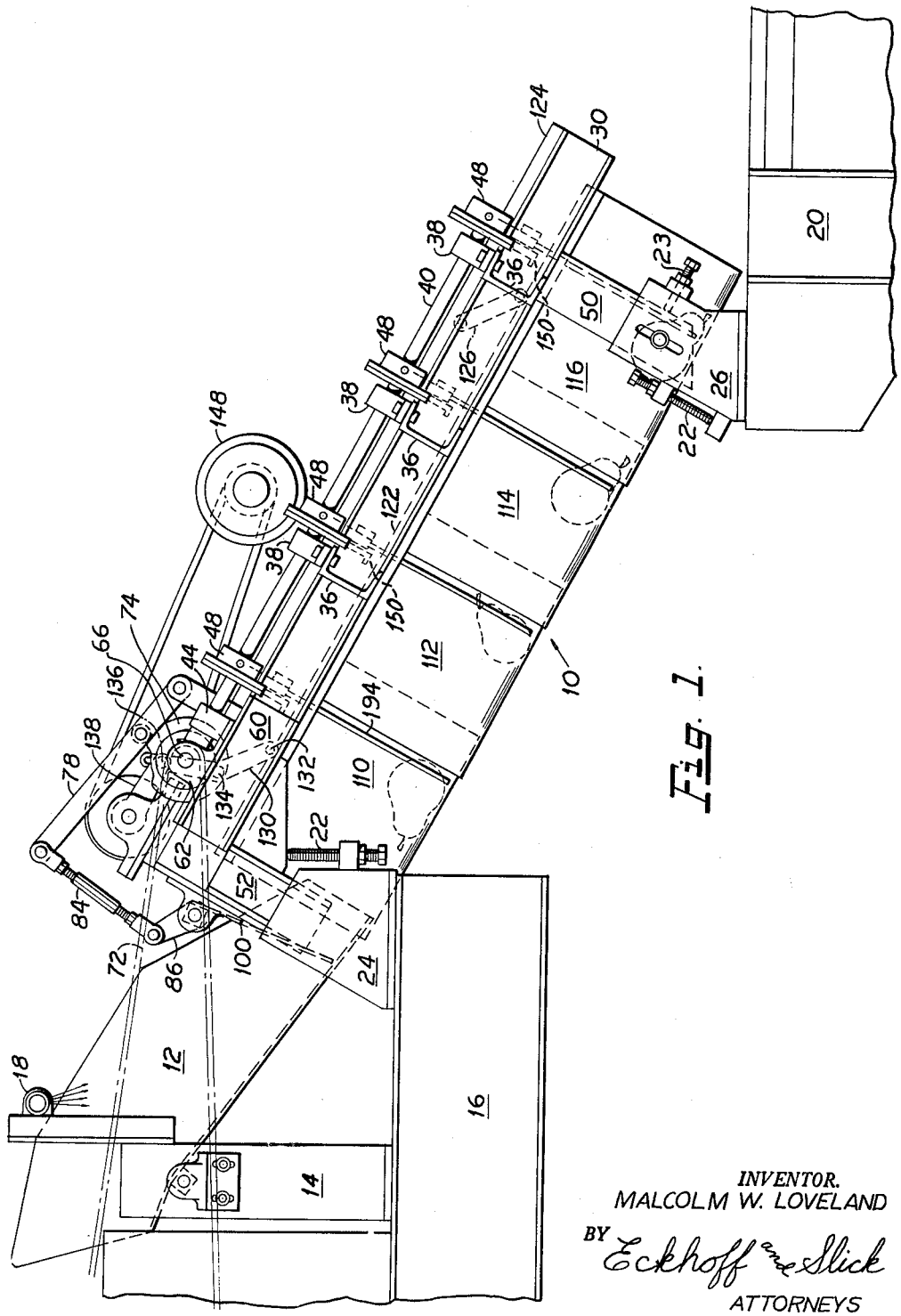
FIGURE 1 is a side elevational view of the preferred structure of this invention, also showing a portion of a typical device for feeding fruit to the orientor and a portion of a typical device for receiving fruit which has been oriented.

Referring now to the drawings wherein like characters refer to like parts throughout, there is shown an orientor generally 10 having at the left end thereof (FIGURE 1) a metal hopper 12 supported on the upright leg 14 which rests on the frame 16. Water spray means 18 may be provided as shown; this is required to prevent fruit juices from causing the chute from becoming sticky thus changing the coefficient of friction.

At the opposite end of the chute, receiving means 20 for properly oriented pears are provided, which means may consist of a plurality of cups, not shown, mounted on a conveyor. The entire orientor 10 is supported on threaded shanks 22 and 23 which are mounted on brackets 24 and 26 supported respectively by the frame 16 and the frame 20 for adjusting the chute to an optimum shape.

Figure 2:
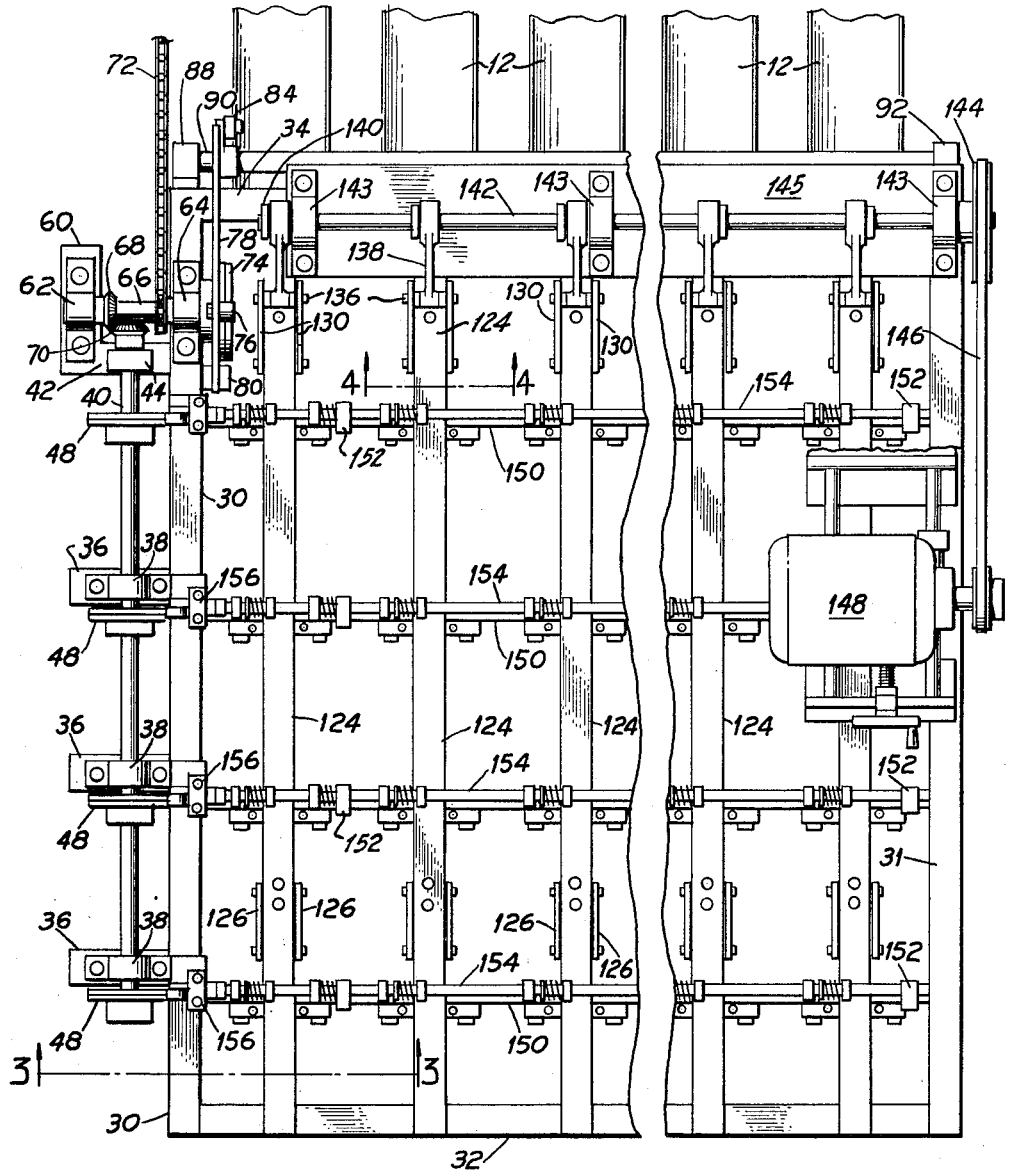
FIGURE 2 is a plan view of the structure showing that it may consist of a plurality of similar lines positioned side-by-side.

As shown in FIGURES 1 and 2, a rectangular overhead support frame is provided consisting of a pair of parallel channels 30 and 31 positioned at an angle to the horizontal. Channels 32 and 34 tie channels 30 and 31 together at each end thereof. The horizontal channels 32 and 34 forming a portion of the frame are hidden in FIGURE 1 by the side channel 30. A plurality of short horizontal brackets 36 are welded to channel 30 which support bearings 38 for longitudinal shaft 40. Bracket 42 is also welded at right angles to channel 30 and supports bearing 44 for the shaft 40 bearing cams 48. A bracket 60 welded to bracket 42 provides support for bearing 62 while bearing 64 is supported on frame member 30. Shaft 66 is journaled in bearings 62 and 64 and supports bevel gear 68 which meshes with bevel gear 70 mounted on the end of shaft 40. Chain 72 is driven by a prime mover, not shown. The transverse shaft 66 also supports cam 74 upon which rides follower 76 secured to lever arm 78 which has pin 80 as its fulcrum supported by upstanding bracket 82 mounted upon channel 30. Secured at the other end of lever arm 78 is adjustable connecting rod 84 which is joined at its other end to crank arm 86. Bearings 88 and 92 support shaft 90, as seen in FIGURE 2. Individual gates 100 are mounted at the mouth on blocks 102 (FIGURE 5) which are fixed to shaft 90. As the follower 76 enters the depression in the cam 74, crank arm 86 will cause the blocks 102 and gates 100 to rotate counter-clockwise, as seen in FIGURE 5, to permit a pear to enter the orientor.

Referring back to FIGURE 1, there is seen a plurality of partially telescoping troughs or chutes 110, 112, 114 and 116 which are preferably of a fabric or plastic material such as polyvinylchloride and of such a weight that they may flex readily and normally tend to form a deep but narrow passage for the pears being oriented such that as the pears pass therethrough, the side walls of the chutes will contact the pears and exert a drag on the sides of the pears so as to permit the smaller end of the pear to rotate clockwise as seen in the sequence of FIGURE 1. In a preferred embodiment of this invention, a material is selected for the flexible fabric or plastic chute which has a high coefficient of friction with the surface of a pear which may or may not have had its skin removed. Instead of using several telescoping chutes, a single chute can be used, as has been indicated.

Figures 3, 4:
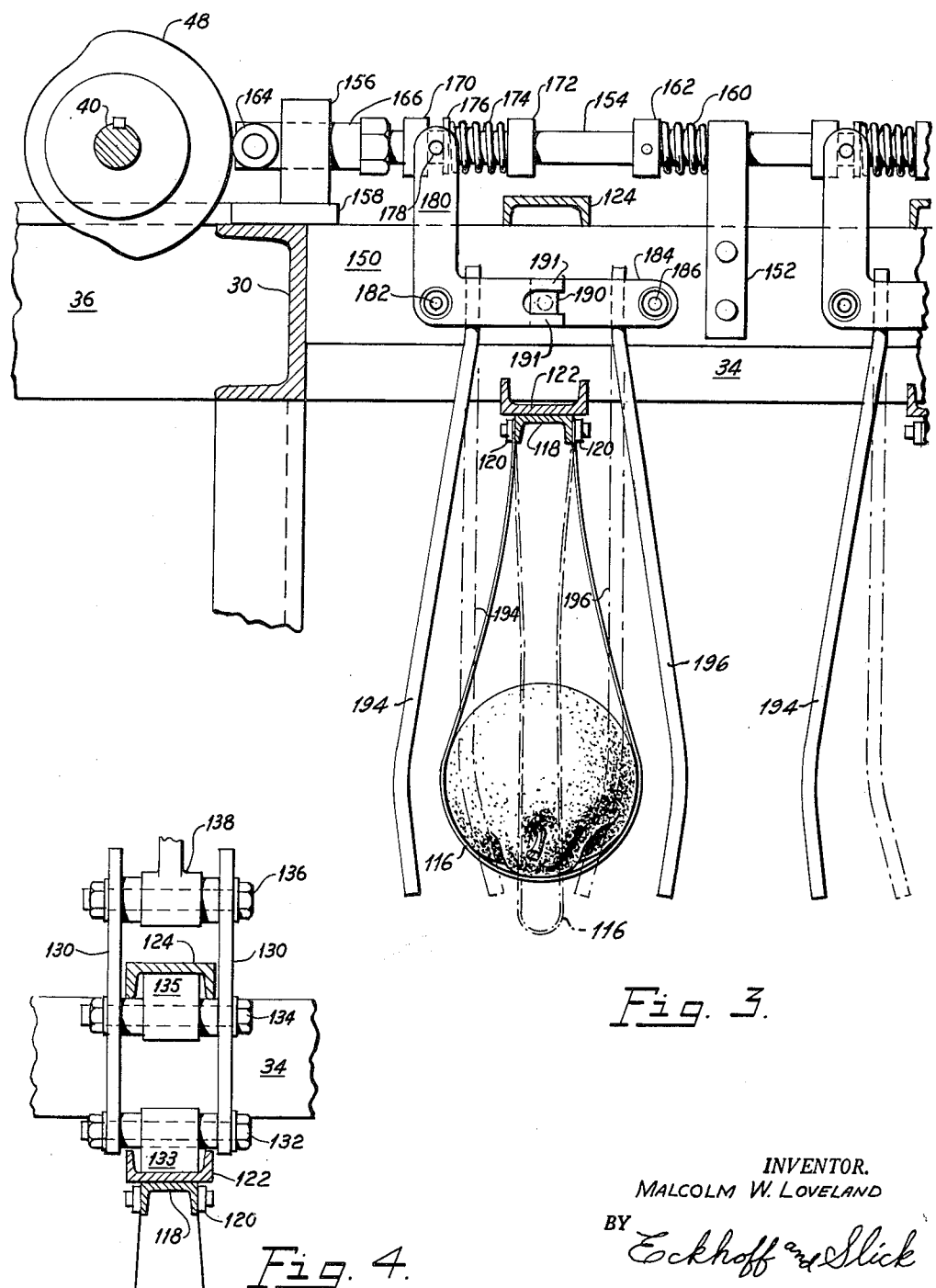
FIGURE 3 is an enlarged fragmentary sectional view taken on the lines 3—3 of FIGURE 2.
FIGURE 4 is an enlarged partial sectional view through the line 4—4 of FIGURE 2.

Each of the chutes 110–116 is supported by the combination of inverted channel 118 (see FIGURE 3) and metal strips 120 which are suitably secured over the upper edges of the walls to either side of the channel 118. Channels 122 support channels 118 and are suspended in turn from the channels 124 by means of idler links 126 and the lowermost arms of the bell cranks 130, thus to form a parallelogram. In FIGURES 1 and 4, each bell crank is pivoted at 132 and 134 about pins in bearing blocks 133 and 135 secured respectively to movable channels 122 and the fixed channels 124. The uppermost end of each bell crank 130 is secured by wrist pin 136 to connecting rods 138 which are eccentrically mounted at 140 about shaft 142 journaled in bearings 143, which are supported on a plate 145 (FIGURES 1 and 2). Pulley 144 is driven by belt 146 trained about the pulled of prime mover 148.

Horizontally mounted between each of the frame members 30 and 31 are spaced supporting strips 150 (FIGURES 1, 2 and 3). Brackets 152 stand upright therefrom and support for sliding motion transverse rods 154. The rods are also slidably mounted in blocks 156 secured to plates 158, in turn supported by channels 30. Compression springs 160 cooperating with collars 162 fixedly secured to the rods 154 normally tend to urge the rods 154 to the left, as seen in FIGURE 3, so that the cam rollers 164 are held in tight engagement with cams 48. The cam followers are in turn rotatably mounted with respect to the fittings 166 mounted on the ends of the rods 154. Pairs of collars 170 and 172 together with compression springs 174 and bearing plates 176 provide means for tightly engaging the pins 178 of the upper arms of the bell cranks 180 which are pivotally mounted at 182 on the cross-bars 150. Also pivotally mounted to the cross-bars 150 are the arms 184 at pivot points 186, forming a part of a toggle mechanism. One end of each arm 184 is provided with a rotatably mounted block 190 which fits between the fingers 191 at the lowermost end of the bell crank 180. It is seen, therefore, that as the bell crank 180 pivots in a counterclockwise direction, the fingers will be lifted as well as bar 184. Secured as shown in FIGURE 3 to the lowermost arm of each bell crank 180 and arm 184 is the pair of fingers 194 and 196 which are positioned on the exterior of the fabric or plastic of the chutes 110, 112, 114 and 116.

As will be observed from viewing the front end of the chute structure shown in FIGURE 3, the flexible sheet material providing the chute depends from the channel 118 and the plates 120 and when a pear is not within the chute, the configuration of the chute is essentially that shown in the dot-dash lines in FIGURE 3. In this position, the side walls providing the chute are out of engagement with the arcuate portion of each of the fingers 194 and 196 and are relatively close together, the space between the side walls measured normal to them being substantially less than the diameter of the spherical butt end of the smallest pear which could be oriented. As the pear moves down the chute, it spreads the side walls apart until it comes into engagement with the fingers 194 and 196, operating in pairs. Since these are normally spaced apart a distance less than the diameter of the butt end of the pear, passage of the pear is momentarily interrupted. If the pear has been sliding down the chute with its stem end trailing, its momentum may roll the pear so that it comes to rest in a stem-up position, the second position shown in FIGURE 1. It is easy then to turn it to a stem end leading position as the jaws open since when a pear assumes the orientation of the second pear from the left in FIGURE 2, the stem end is over-balanced and rests on the fingers, ready to turn downward upon release. If the pear has been sliding stem end first, engagement with the fingers merely results in the stem end sliding between them. In either case, the stem end leads as the fruit is discharged from the chute.

In operation, the pears are fed one at a time down chutes 12 where they encounter gate 100 as shown in FIGURE 5. Rotation of the cam 74 in a clockwise direction permits the follower 76 to drop into the depression so as to permit the lever arm 78 to cause the gate 100 to pivot in a counterclockwise direction, thus admitting the pear to the first U-shaped chute segment 110. The fingers 194 and 196 are in the position represented by the dot-dash lines of FIGURE 3 when a pear reaches the first position shown in the dotted lines in FIGURE 1. They normally are in a closed position so that the pear is stopped. Meanwhile, through the action of prime mover 148 (FIGURES 1 and 2), power is delivered to shaft 142 and rapid oscillating motion is transmitted through connecting rod 138 so as to cause the bell crank 130 to oscillate the channel 122 and hence the entire assembly of chute members 110–116. The oscillating motion tends to encourage forward movement of the pear as well as to cause it to tumble somewhat so as to result in the sequence more or less as shown in FIGURE 1 wherein the smaller end of the pear, which is not frictionally engaged with the fabric or plastic material, rotates clockwise over the butt end of the pear so as to assume the position shown at the right of FIGURE 1. The action of the fingers 194 and 196 is so timed by means of the cams 48 that a pear is stopped immediately prior to entering each section 112, 114 or 116. This is to assure that should a pear already be in the section next to be entered, such pear will have an opportunity to reach one of the sets of fingers 194 and 196 so that each chute will contain only a single pear at one time. This is important since in practice large and small pears will be fed together. A relatively large pear ordinarily will bulge the plastic material to such a degree that should two pears be in a single chute together, the smaller pear will not engage the walls of the chute and hence may not be oriented properly. The provision of means for assuring that only a single pear is in a single segment of the apparatus at any one time is of importance if it is desired, as shown, to provide a system wherein a plurality of pears may be undergoing orientation at one time while traveling through a relatively short path.

It is seen that each pair of fingers 194 and 196 performs a dual function. The fingers constrict the chute side walls so that these engage the pear, and as a result the pear is permitted to tumble and is properly oriented. Further, by providing periodically a closed entrance to each of the segments constituting the entire chute assembly, the fingers assure that no more than a single pear will be found in each segment at any one time. Pears which are round or nearly so will enter a chute at such a velocity that they will continue to tumble end over end unless stopped immediately prior to entrance thereto. Stopping the pear and then releasing it while in contact with the chute brings the orienting forces into play. The fingers at the extreme downward end of the chute also serve to release a pear at a time which will ensure having a cup (not shown) in place to receive the pear.

When a single chute member is employed, one can employ a single set of fingers 194 and 196.

Obviously, many modifications and variations may be made without departing from the spirit and scope of this invention, and therefore only such limitations should be imposed as are indicated in the appended claims.

I claim:
1. A device for orienting a pear comprising:
   (a) a flexible elongated sheet;
   (b) means supporting said sheet with one end elevated with respect to the other, said sheet being mounted on said support means to provide a U-shaped chute having its opposite side walls depending, in the absence of a pear, in a substantially parallel spaced relationship in which the side walls are spaced apart a distance, measured at normal to said side walls, which is substantially less than the maximum diameter of the butt end of the pear whereby when a pear is in the chute the side walls engage the maximum dimension of said pear at its butt end;
   (c) an opening at either end of said chute for receipt and discharge of a pear;
   (d) means for feeding pears into the elevated end of said chute;
   (e) a first and a second finger, each finger depending on a side of the chute with each pair of fingers in a parallel spaced relationship normally less than the diameter of the butt of the pear sliding through the chute whereby the fingers restrain momentarily passage to the pear down said chute and impart an over-turning movement to a pear sliding down the chute butt-end first; and
   (f) means for separating the fingers to permit the pear to continue its passage down the chute.

2. A device for orienting a pear comprising:
   (a) a flexible elongated sheet;
   (b) means supporting said sheet with one end elevated with respect to the other, said sheet being mounted on said support means to provide a U-shaped chute having its opposite side walls depending, in the absence of a pear, in a substantially parallel spaced relationship in which the side walls are spaced apart a distance, measured at normal to said side walls, which is substantially less than the maximum diameter of the butt end of the pear whereby when a pear is in the chute the side walls engage the maximum dimension of said pear at its butt end;
   (c) an opening at either end of said chute for receipt and discharge of a pear;
   (d) means for feeding pears into the elevated end of said chute;
   (e) a first and a second finger, each finger depending on a side of the chute with each pair of fingers in a parallel spaced relationship normally less than the diameter of the butt of the pear sliding through the chute whereby the fingers restrain momentarily passage of the pear down said chute and impart an over-turning movement to a pear sliding down the chute butt-end first;
   (f) means for separating the fingers to permit the pear to continue its passage down the chute; and
   (g) means for reciprocating the chute support means to impart a shaking action to said chute.

3. A device for orienting pears comprising:
   (a) a plurality of overlapping flexible sheets;
   (b) means supporting said flexible sheets to form a unitary U-shaped chute with telescoping sections and with one end elevated, said unitary chute being mounted on said support means with opposite side walls depending, in the absence of a pear, in a substantially parallel spaced relationship in which each pair of side walls is spaced apart a distance, measured normal to the said side walls, which is substantially less than the maximum diameter of the butt end of the pear whereby when the pear is in the chute the side walls engage the maximum dimension of said pear at its butt end;

(c) an opening at either end of the said unitary chute structure for receipt and discharge of a pear;
(d) means for feeding pears into the elevated end of the said chute;
(e) a plurality of pairs of opposed cooperating fingers, each finger of each pair depending upon a side of the chute with each cooperating pair of fingers being a spaced, parallel relationship normally less than the diameter of a butt of a pear sliding through the chute whereby the fingers restrain momentarily passage of a pear down said chute and impart an over-turning movement to the pear sliding down a chute butt-end first, a single pair of fingers being positioned immediately prior to the point of overlap of adjacent sheets and at the lowermost end of each of the said sheets; and
(f) means for separating the fingers to permit a pear to continue its passage down the chute.

4. A device for orienting pears comprising:
(a) a plurality of overlapping flexible sheets;
(b) means supporting said flexible sheets to form a unitary U-shaped chute with telescoping sections and with one end elevated, said unitary chute being mounted on said support means with opposite side walls depending, in the absence of a pear, in a substantially parallel spaced relationship in which each pair of side walls is spaced apart a distance, measured normal to the said side walls, which is substantially less than the maximum diameter of the butt end of the pear whereby when the pear is in the chute the side walls engage the maximum dimension of said pear at its butt end;
(c) an opening at either end of the said unitary chute structure for receipt and discharge of a pear;
(d) means for feeding pears into the elevated end of the said chute;
(e) a plurality of pairs of opposed cooperating fingers, each finger of each pair depending upon a side of the chute with each cooperating pair of fingers being a spaced, parallel relationship normally less than the diameter of a butt of a pear sliding through the chute whereby the fingers restrain momentarily passage of a pear down said chute and impart an overturning movement to the pear sliding down a chute butt-end first, a single pair of fingers being positioned immediately prior to the point of overlap of adjacent sheets and at the lowermost end of each of the said sheets;
(f) means for separating the fingers to permit a pear to continue its passage down the chute; and
(g) means for reciprocating the chute support means to impart a shaking action to said chute.

References Cited in the file of this patent
UNITED STATES PATENTS

| | | |
|---|---|---|
| 695,329 | McCabe | Mar. 11, 1902 |
| 1,788,202 | Pardee et al. | Jan. 6, 1931 |
| 3,101,831 | Gaddimi | Aug. 27, 1963 |